United States Patent [19]
Cho

[11] Patent Number: 4,996,706
[45] Date of Patent: Feb. 26, 1991

[54] METHOD OF CONTROLLING THE ELECTRIC POWER SUPPLIED TO A MODEM

[75] Inventor: Tae-Young Cho, Suwon, Rep. of Korea

[73] Assignee: Samsung Electronics Co., Ltd., Kyonggi, Rep. of Korea

[21] Appl. No.: 345,617

[22] Filed: May 1, 1989

Related U.S. Application Data

[63] Continuation of Ser. No. 126,766, Nov. 30, 1987, abandoned.

[30] Foreign Application Priority Data

Dec. 2, 1986 [KR] Rep. of Korea .................... 86-10254

[51] Int. Cl.⁵ .......................................... H04M 11/00
[52] U.S. Cl. ..................................... 379/93; 379/102
[58] Field of Search ........................... 379/93, 96–98, 379/102, 105

[56] References Cited

U.S. PATENT DOCUMENTS

| 3,745,251 | 7/1973 | Fretwell | 375/8 |
| 3,908,086 | 9/1975 | Marino et al. | 379/98 |
| 4,415,774 | 11/1983 | Driver | 379/98 |
| 4,591,662 | 5/1986 | Legros et al. | 379/96 |
| 4,647,721 | 3/1987 | Busam et al. | 379/102 |
| 4,656,318 | 4/1987 | Noyes | 379/98 |
| 4,677,646 | 6/1987 | Dodds et al. | 379/93 |
| 4,679,226 | 7/1987 | Muehleisen | 379/102 |
| 4,701,946 | 10/1987 | Oliva et al. | 379/98 |
| 4,723,269 | 2/1988 | Summerlin | 379/105 |

FOREIGN PATENT DOCUMENTS

| 0251593 | 1/1988 | European Pat. Off. | 375/8 |
| 0013852 | 1/1982 | Japan | 379/100 |
| 0088959 | 5/1983 | Japan | 379/90 |
| 0084338 | 4/1988 | Japan | 375/8 |
| 8602797 | 5/1986 | World Int. Prop. O. | 379/98 |

OTHER PUBLICATIONS

MacBride et al., "Remote Computer Power-On Via Switched Telephone Network", *IBM Technical Disclosure Bulletin*, vol. 25, No. 6, Nov. 1982, p. 3064.

Primary Examiner—Jin F. Ng
Assistant Examiner—Wing F. Chan
Attorney, Agent, or Firm—Clifford A. Poff

[57] ABSTRACT

A method is disclosed for controlling the supply or electric power to a modem in a data communication interface circuit. A power supplying and blocking circuit is additionally combined with the interface. The power supplying and blocking circuit which is controlled by a controller supplies only the controller and a ring detector of a data access circuit with the electric power when the interface circuit is placed in a stand-by mode. The modem is supplied with power only when transmitting or receiving data.

15 Claims, 3 Drawing Sheets

METHOD OF CONTROLLING THE ELECTRIC POWER SUPPLIED TO A MODEM

This is a continuation of co-pending application Ser. No. 07/126,766 filed on Nov. 30, 1987 now abandoned.

This invention relates to a method of controlling the power supplied to a modem for transmitting or receiving data between a telephone line and a computer.

When data is transmitted or received by the operation a computer in the state of the art electric power is supplied to a modem of a data communication interface circuit and the peripheral circuitry associated therewith so as to operate all the elements of the interface circuit even when data transmission is not carried out, thereby resulting in increased, and hence wasteful, power consumption. Furthermore, undesirable electromagnetic radiation and heat generated by the elements receiving the electric power deleteriously influences the peripheral equipment of the computer.

SUMMARY OF THE INVENTION

It is an object of the present invention to provide a method of controlling the electric power supplied to the modem whereby the modem is supplied with the electric power to carry out the data processing when the data is being transmitted and, when the data is not being transmitted, the supply of electric power to the modem is blocked off so as to place the interface circuit in a stand-by mode in order to decrease the power consumption of the modem and prevent generation of the undesirable electromagnetic radiation.

The present invention is comprised of a power supplying and blocking means combined with a conventional data communication interface circuit for controlling the data transmission of a computer. The conventional data communication interface circuit comprises a RS-232 C connector, a modem, a controller and a data access means. According to the present invention, in the normal state in which data is not transmitted or received, only the controller and the ring detector of the data access means are supplied with power. However, when data is transmitted or received by the computer, the controller controls the power supplying and blocking means by sensing the data transmission input signal coming from the computer or the calling signal coming through the ring detector from the other data transmission station, so that the power supplying and blocking means supplies the circuitry of the modem with power.

DETAILED DESCRIPTION OF A PREFERRED EMBODIMENT

The present invention will be more fully explained with reference to the drawings attached hereto.

Figure 1A:
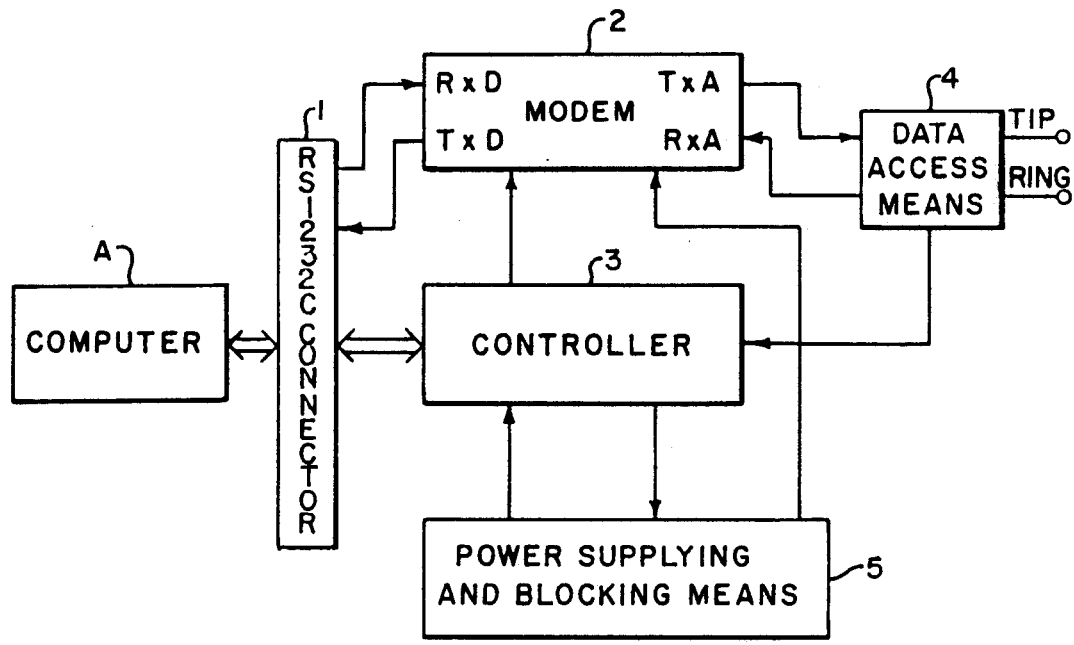
FIG. 1(A) is a block diagram illustrating the data communication interface circuit according to the present invention.

FIG. 1(A) illustrates the data communication interface circuit embodying the present invention. The data transmitted by the computer A is inputted into controller 3 and modem 2 through RS-232 C connector 1. Controller 3 is connected with modem 2, and modem 2, in turn, is connected with data access means 4. Data access means 4 is, in turn, connected with a telephone line tip and ring lines. Thus, the data can be transmitted or received by the computer A through the telephone line.

The present invention utilizes a power supplying and blocking means 5 in combination with a conventional data communication interface circuit including modem 2 such that the data communication interface circuit is controlled by the controller 3 to supply the modem with the electric power or alternatively, to block the supply of controller 3, data access means 4, and RS-232C connector 1 power.

Figure 1B:
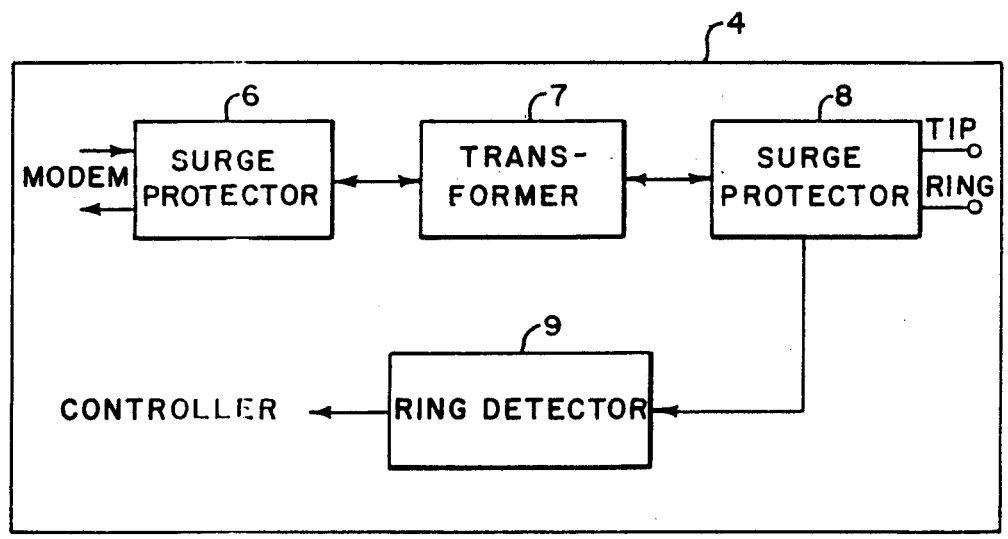
FIG. 1(B), is a block diagram illustrating the data access means of FIG. 1(A) in greater detail.

FIG. 1(B) depicts a detailed illustration of the data access means 4. Data reception from the telephone line is inputted into the modem 2 successively through the telephone line, surge protector 8, transformer 7 and surge protector 6. A calling signal generated on the telephone line coming from the other transmission side is inputted into the controller 3 successively through the surge protector 8 and the ring detector 9.

For data transmission from the computer A to the telephone line, data modulated by the modem 2 is transmitted successively through the surge protector 6, transformer 7, surge protector 8 and the telephone line.

The surge protectors 6 and 8 comprise varistors and zener diodes in order to protect the modem from lightning or high voltage entering the telephone line.

The ring detector 9 comprising an opto-coupler transforms the calling signal generated on the telephone line from the other transmission station into a square wave which is inputted into the controller 3.

Figure 2A:
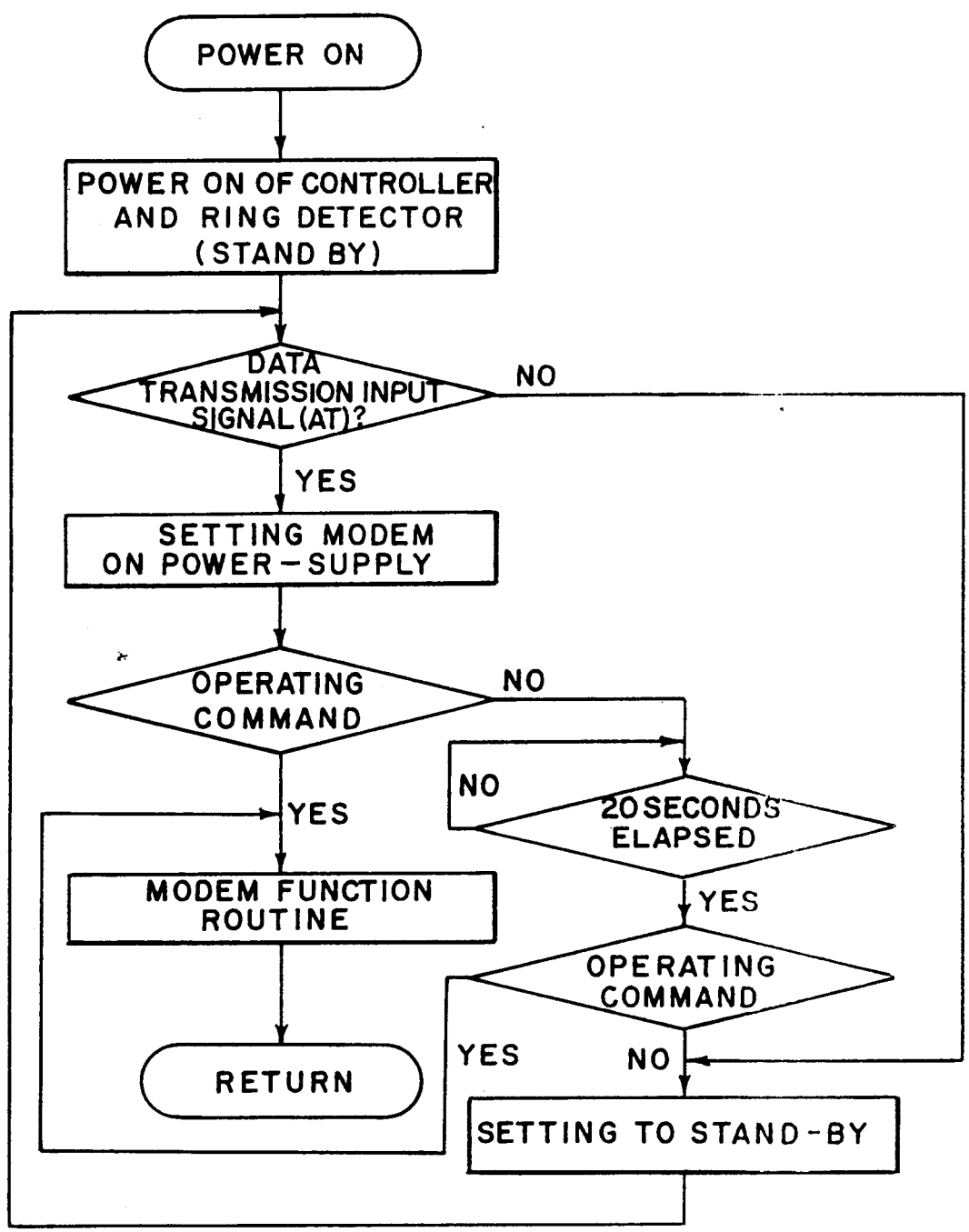
FIG. 2(A) is a flow chart illustrating the operating sequence during the data transmission.
Figure 2B:
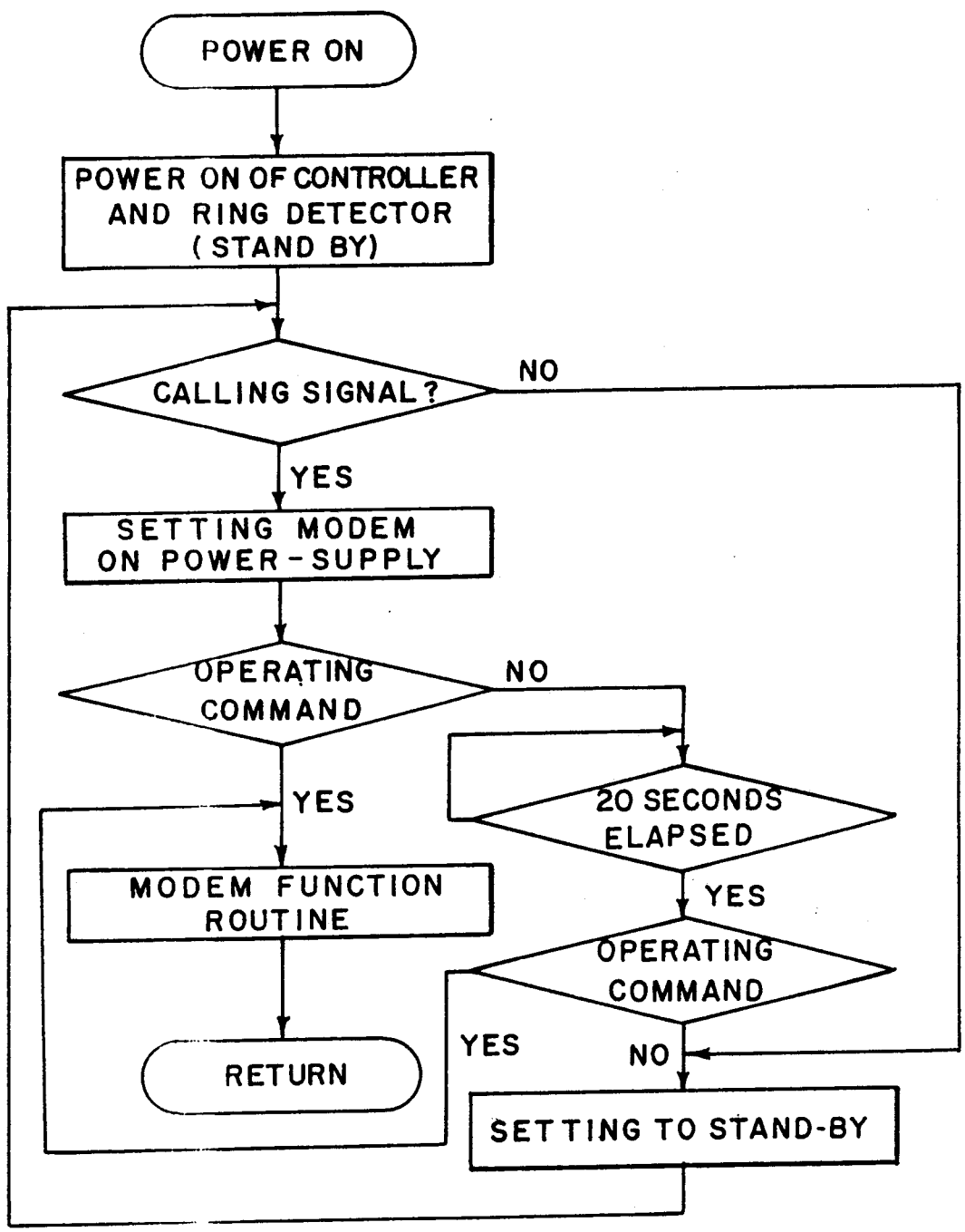
FIG. 2(B) is a flow chart illustrating the operating sequence during the data receiving.

With reference to FIGS. 2(A) and 2(B) and the following description, the operation of the data communication interface circuit comprising the power supplying and blocking means controlled by the controller will be more clearly understood.

FIGS. 2(A) and 2(B) are flow charts of the operating sequences, respectively, during data transmission and data receiving.

The program for controlling the power supplied to the modem is stored in the ROM of the controller 3. Controller 3 comprises a one chip micro-computer. Also stored in the ROM is the means for controlling the data processing of the modem.

As stated hereinabove, only the controller 3 and the ring detector 9 of the data access means 4 are supplied with power at the normal state when data is neither transmitted nor received. And in such normal state, the modem 2 is not supplied with the power. In this mode, the data communication interface circuit is considered to be in "stand-by".

When the data communication interface circuit receives a data transmission input signal AT (of the HAYES commutable protocol), the controller 3, by checking the signal AT, controls the power supplying and blocking means 5 so that the power supplying and blocking means supplies the modem 2 and the peripheral circuitry with the electric power.

Subsequently, after receiving an operating command from the computer, the modem 2 modulates the data inputted from the computer A through the RS-232C connector 1 and supplies the data access means 4 with the data. The data access means 4 transforms the modulated signal to transmission level to permit transmission of the signal through the telephone line.

The data transmission input signal AT is a standard command of the HAYES commutable protocol commonly used to cause the modem to modulate or demodulate data. Detection of this command by the controller 3 causes the modem to operate.

However, if 20 seconds elapses without a subsequent operating command after input of the data transmission signal AT, the controller 3 checks whether or not the operating command or mode of command has appeared.

Consequently, if the operating command appears, the controller 3 causes the power supplying and blocking means 5 to continue to supply power to the modem and hence the remainder of the interface circuit. If the operating command does not appear, the controller causes the power supplying and blocking means 5 to block the supply of power to the modem thus causing the interface circuit to return to "stand-by" mode.

Namely, as shown in FIG. 2(A), if a data transmission signal AT is not inputted, the interface circuit is maintained in stand-by so that only the controller and ring detector are supplied with power. If the signal AT is inputted, then the modem and the peripheral circuitry are supplied with the power. Then, if a subsequent operating command is inputted with the modem being supplied with the power, the modem function routine is carried out. But, if 20 seconds elapse without the operating command, the controller 3 checks whether or not the operating command has appeared. If the operating command appears, the interface circuit remains supplied with power, otherwise, the interface circuit is returned to stand-by.

Similarly, if the controller 3 receives a calling signal coming from the other data transmission station through the surge protector 8 and the ring detector 9, the controller 3 supplies the modem with power according to the operating sequence shown in FIG. 2(B), whereby the transmitted data is inputted into the modem through the surge protector 8, transformer 7 and surge protector 6.

Thus, control of the interface circuit is the same whether transmitting or receiving data, except in the operating sequence of FIG. 2(B) wherein the calling signal coming from the other data transmission station causes the interface circuit to supply the modem with power.

Here, the functioning of the modem is well-known in the technical field to which the present invention belongs.

Hence, according to the present invention, the modem of the data communication interface circuit is supplied with the electric power only when transmitting or receiving the data, otherwise, the interface circuit is placed in a stand-by mode to reduce power consumption and prevent the generation of undesirable electromagnetic radiation.

I claim:

1. A method of controlling the supply of electrical power to a modem during those times in which data is being transmitted and received, said method including the steps of:
supplying electrical power to a controller adapted for detecting both a data transmission signal and a calling signal while said modem is at a standby mode of operation;
terminating said standby mode of operation in response to detection of any of said data transmission signal and said calling signal by said controller; and thereafter
returning said modem to said standby mode of operation by determining the absence of an operating command associated with any of said data transmission signal and said calling signal at a predetermined time interval after detection of any of said data transmission signal and said calling signal by said controller.

2. The method according to claim 1 wherein said step of returning said modem to said standby mode of operation comprises blocking the supply of electric power to said modem.

3. The method according to claim 1 wherein said step of terminating comprises maintaining a supply of electrical power to said modem in response to detection of said operating command associated with any of said data transmission signal and said calling signal.

4. The method according to claim 3 wherein said data transmission signal comprises a command of a HAYES commutable protocol.

5. The method according to claim 3 wherein said step of supplying electrical power to said modem includes, upon detection of any of said data transmission signal and said calling signal, subsequently detecting for the presence of an operating command during said predetermined time interval.

6. A method for supplying electrical power to a modem interfacing a computer and a communication transmission line such that the modem is operational only during those times in which data is transmitted by the computer, said method comprising the steps of:
powering a controller adapted for receiving both a calling signal transmitted along the communication transmission line and a data transmission signal transmitted by the computer;
detecting by said controller those times in which any of said calling signal and said data transmission signal is generated;
powering the modem in response to the detection of any of said signals by said controller;
blocking the supply of electrical power to the modem by determining the absence of said data transmission signal and said calling signal to thereby reduce power consumption and prevent the generation of undesirable electromagnetic radiation; and
checking, by using said controller, the status of the transmission of data responsive to those times in which the controller receives any of said calling signal and said data transmission signal but fails to receive a subsequent operating command associated with any of said signals within a predetermined period of time after detection of any of said signals.

7. The method of claim 6 wherein said data transmission signal includes an 'AT' attention code signal of a HAYES commutable protocol system.

8. The method of claim 6 wherein said communication transmission line includes a telephone line.

9. The method of claim 8 wherein a ring detector interconnects the telephone line and the controller.

10. The method of claim 9 wherein said calling signal is transmitted to a ring detector.

11. The method of claim 8 wherein data is transmitted along a tip line.

12. A method of controlling the supply the power to a communication interface circuit interconnecting a computer and a transmission line, said communication interface circuit including a modem, a controller adapted for detecting both a data transmission 'AT' signal and a ring signal, a data access means, and a connector, said method including the steps of:

maintaining said interface circuit in a standby mode wherein a power supplying and blocking means supplies only the controller and a ring detector portion of the data access means with electrical power during those times in which data is not transmitted through said modem of the communication interface circuit;

detecting by said controller the existence of any of a data transmission 'AT' signal generated by the computer and a ring signal generated on the transmission line, said data transmission 'AT' signal and said ring signal being indicative that data may be transmitted through the modem of the communication interface circuit;

supplying the modem with electrical power when any of said data transmission 'AT' signal and said ring signal is detected by said controller, thereby allowing transfer of data through the modem;

maintaining the supply of electrical power to the modem for a predetermined period of time to permit detection of an operating command associated with any of said data transmission 'AT' signal and said ring signal; and reverting back to said standby mode in the absence of detection of the operating command within said predetermined time period.

13. The method of claim 12 wherein said transmission line includes a telephone line.

14. The method of claim 13 wherein said ring detector portion of the data access means interconnects the telephone line and the controller.

15. The method of claim 12 wherein said predetermined period of time in which the supply of electrical power is maintained to the modem is 20 seconds.

* * * * *